United States Patent
Danielsson et al.

(10) Patent No.: US 12,293,529 B2
(45) Date of Patent: May 6, 2025

(54) METHOD, SYSTEM AND NON-TRANSITORY COMPUTER-READABLE MEDIA FOR PRIORITIZING OBJECTS FOR FEATURE EXTRACTION

(71) Applicant: Axis AB, Lund (SE)

(72) Inventors: Niclas Danielsson, Lund (SE); Christian Colliander, Lund (SE); Amanda Nilsson, Lund (SE); Sarah Laross, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 18/616,830

(22) Filed: Mar. 26, 2024

(65) Prior Publication Data

US 2024/0386579 A1 Nov. 21, 2024

(30) Foreign Application Priority Data

May 15, 2023 (EP) .................................. 23173346

(51) Int. Cl.
*G06V 10/40* (2022.01)
*G06T 7/215* (2017.01)
*G06T 7/246* (2017.01)
*G06V 10/25* (2022.01)

(52) U.S. Cl.
CPC ............. *G06T 7/215* (2017.01); *G06T 7/246* (2017.01); *G06V 10/25* (2022.01); *G06V 10/40* (2022.01)

(58) Field of Classification Search
None
See application file for complete search history.

(56) References Cited

U.S. PATENT DOCUMENTS

| 10,643,101 | B2 | 5/2020 | Mathew et al. |
| 2018/0374233 | A1 | 12/2018 | Zhou et al. |
| 2019/0206065 | A1* | 7/2019 | Ju .............................. G06T 7/74 |

(Continued)

FOREIGN PATENT DOCUMENTS

CN 111582032 A 8/2020

OTHER PUBLICATIONS

Bayar, E., & Aker, C. (2024). When to extract ReID features: a selective approach for improved multiple object tracking. arXiv preprint arXiv:2409.06617. (Year: 2024).*

(Continued)

*Primary Examiner* — Ian L Lemieux
(74) *Attorney, Agent, or Firm* — Volpe Koenig (57) ABSTRACT

A method for prioritizing feature extraction for object re-identification in an object tracking application. Region of interests (ROI) for object feature extraction is determined based on motion areas in the image frame. Each object detected in an image frame and which is at least partly overlapping with a ROI is associated with the ROI. A list of candidate objects for feature extraction is determined by, for each ROI associated with two or more objects: adding each object of the two or more objects that is not overlapping with any of the other objects among the two or more objects with more than a threshold amount. From the list of candidate objects, at least one object is selected, and image data of the image frame depicting the selected object is used for determining a feature vector for the selected object.

13 Claims, 6 Drawing Sheets

(56) References Cited

U.S. PATENT DOCUMENTS

2022/0198778 A1* 6/2022 Danielsson ............... G06N 3/04
2023/0274560 A1* 8/2023 Bordone ................ G06V 10/25
  382/103

OTHER PUBLICATIONS

Wojke, N., Bewley, A., & Paulus, D. (Sep. 2017). Simple online and realtime tracking with a deep association metric. In 2017 IEEE international conference on image processing (ICIP) (pp. 3645-3649). IEEE. (Year: 2017).*

Maggiolino, G., Ahmad, A., Cao, J., & Kitani, K. (Oct. 2023). Deep oc-sort: Multi-pedestrian tracking by adaptive re-identification. In 2023 IEEE International Conference on Image Processing (ICIP) (pp. 3025-3029). IEEE. (Year: 2023).*

Fergnani, F., et al., "Body Part Based Re-identification From an Egocentric Perspective", 2016 IEEE Conference on Computer Vision and Pattern Recognition Workshops (CVPRW), Las Vegas, NV, USA, (2016).

Uijlings, J. R., et al., "Selective Search for Object Recognition", Paper, Cornell University Library, (2013).

Jodoin, J., et al., "Urban Tracker: Multiple object tracking in urban mixed traffic", IEEE Winter Conference on Applications of Computer Vision, (2014).

Naushad Ali, M. M., et al., "Multiple object tracking with partial occlusion handling using salient feature points", Information Sciences, (2014).

Lamichhane, B., et al., "DirectionSORT: Multi-Object Tracking using Kalman Filters and the Hungarian Method with Directional Occlusion Handling", (2022).

Chu, Q., "Online Multi-Object tracking using CNN based single object tracker with spatial-temporal attention mechanism", International Conference on Computer Vision, (2017).

Extended European Search Report issued on Sep. 11, 2023 for European Patent Application No. 23173346.0.

Bewley, "Simple Online and Realtime Tracking," (2017).

* cited by examiner

METHOD, SYSTEM AND NON-TRANSITORY COMPUTER-READABLE MEDIA FOR PRIORITIZING OBJECTS FOR FEATURE EXTRACTION

TECHNICAL FIELD

The present invention relates to the technical field of object re-identification and in particular to a method, system and non-transitory computer-readable media for prioritizing objects for feature extraction for the purpose of object re-identification in an object tracking application.

BACKGROUND

In an object tracking application, re-identification refers to the process of identifying an object in a video sequence as the same object that was previously detected in a previous frame or frames of the video sequence or in a frame of another video sequence. This is an important task in object tracking, as it allows the system to maintain a consistent track of the object's movement across the image frames of the video sequence.

The process of object re-identification can be challenging, as objects in a video sequence can undergo a variety of transformations over time, such as changes in appearance, orientation, scale, and occlusion. These changes can make it difficult to track an object continuously from one image frame to the next.

To address these challenges, object tracking systems typically use a combination of object detection, feature extraction, and matching techniques to identify and track objects in a video sequence.

Feature extraction involves extracting a set of descriptive features (a feature vector) from the objects detected in each frame. These features may include colour, texture, shape, or other characteristics that can be used to differentiate one object from another. Feature extraction may be sensitive to object occlusion. For example, if two objects partially overlap, the feature extraction process may extract a feature vector that represent a combination of the two objects, rather than two feature vectors that are specific to each object individually. This may lead to confusion during the matching process, as the extracted features may not match well with the corresponding features in the previous frame.

Moreover, it may not be possible or suitable to determine feature vectors for each detected object in each image frame of the video sequence since this may increase the computational resources needed for both the feature extraction process as well as the matching process.

There is thus a need for improvements in this context.

SUMMARY

In view of the above, solving or at least reducing one or several of the drawbacks discussed above would be beneficial, as set forth in the attached independent patent claims.

According to a first aspect of the present invention, there is provided a method for prioritizing objects for feature extraction for the purpose of object re-identification in an object tracking application, comprising the steps of: receiving an image frame depicting a scene comprising a plurality of objects; receiving object detection data comprising, for each object of the plurality of objects, localization data indicating location and spatial extent of the object in the image frame; receiving motion data indicating one or more motion areas in the image frame, each motion area corresponding to an area in the scene where motion has been detected; for each motion area, determining a region of interest, ROI, for object feature extraction in the image frame, the ROI for object feature extraction overlapping with the motion area; for each ROI for object feature extraction, determining a list of objects at least partly overlapping with the ROI for object feature extraction using the object detection data, and associating the ROI for object feature extraction with the list of objects.

The method further comprises the steps of determining a list of prioritized candidate objects for feature extraction by, for each ROI for object feature extraction associated with two or more objects: for each object of the two or more objects, upon determining that the object is not overlapping with any of the other objects of the plurality of objects with more than a threshold amount, adding the object to the list of prioritized candidate objects for feature extraction.

The method further comprises the step of selecting at least one object among the list of prioritized candidate objects, and for each selected object determining a feature vector for the selected object based on image data of the image frame according to the localization data of the object.

Advantageously, the present method may provide a low complexity and efficient selection criteria for which objects that may be analysed to determine feature vectors for object re-identification. For example, the method does not rely on future object movement predictions to identify object tracks that may be at risk of loss or erroneous association. Instead, motion data indicating one or more motion areas in the (currently analysed) image frame is used. The motion data may be obtained by motion detection techniques such as frame differencing, which do not require prediction. By avoiding the reliance on future object movement predictions, the present method reduces the risk of erroneous object track associations with objects detected.

In addition, the method of the present invention does not rely on the existing object tracks or their associated objects, thus increasing the flexibility of the method. The selection of objects for feature vector determination is decoupled from the existing object tracks and their associations, which may provide more freedom to choose the most suitable objects for feature vector determination.

Additionally, the present method may reduce the risk of feature vector leakage between objects, resulting in a decreased likelihood of erroneous object track associations with objects detected in the image frame. By reducing the risk of feature vector leakage, the present method enhances the accuracy of object tracking and reduces the incidence of false associations between object tracks and objects in the image frame.

Moreover, by giving precedence to motion areas in the image in which two or more objects are located, objects that are likely to either be obscured or cause occlusion in subsequent image frames can be prioritized for feature extraction. This approach prioritizes objects that the object tracker might lose track of in subsequent image frames.

In some embodiments, the step of determining a ROI for object feature extraction comprises extending the motion area by a predetermined extent in each direction. Advantageously, a low complexity way of considering motion in the scene as captured by the image frame may be achieved. The ROI may be determined such that it comprises the motion area extended by an added margin (predetermined extent) around the motion area. The motion area may be extended to identify objects that may potentially occlude each other in the near future, or recently were occluded, and selects them for feature vector determination to facilitate object re-identification. By utilizing this approach, an effective and efficient means of analysing the scene motion to identify relevant objects for feature vector determination and subsequent object re-identification may be achieved.

In some embodiments, the motion data further comprises, for each motion area in the image frame, an indication of a velocity of the detected motion in the corresponding area of the scene, wherein the step of determining a ROI for object feature extraction comprises extending the motion area based on the velocity. Consequently, the ROI for object feature extraction is determined by incorporating the motion area along with an additional margin around it, which is based on the characteristics of the detected motion. This approach may enable a flexible and precise analysis of the scene motion to identify the appropriate objects for feature vector determination and subsequent object re-identification. By utilizing this method, the present embodiment may achieve a targeted and adaptable means of selecting ROIs for feature extraction, leading to improved object tracking and re-identification performance.

In some embodiments, the ROI for object feature extraction is determined by extending the motion area to a greater extent in a direction corresponding to the direction of the velocity compared to a direction not corresponding to the direction of the velocity. Advantageously, a likely future motion in the scene captured by the first image may be considered when determining the ROI for object feature extraction, which may improve identification of appropriate objects for feature vector determination and subsequent object re-identification.

In examples, a shape of the ROI for object feature extraction is one of: a pixel mask, a circle, an ellipse, and a rectangle. Advantageously, a flexible approach of determining the ROI for object feature extraction may be achieved. For example, a pixel mask shaped ROI may be determined using the motion area, possibly subjected to a morphological operation (e.g., dilatation) to extend it. Alternatively, a circular shaped ROI may be obtained by determining the minimal circle that encloses the motion area, optionally augmented with an additional radius. An ellipse may be determined similarly to the circle, optionally extended according to the direction of the velocity. The same strategy may be utilized when determining a rectangle shaped ROI.

In some examples, the threshold amount is 0. This means that no overlap between objects detected in a ROI for object feature extraction is allowed, which in turn may reduce the risk of feature vector leakage between objects, resulting in a decreased likelihood of erroneous object track associations with objects detected in the image frame. In the context of this disclosure, feature vector leakage refers to that the pixel data of the overlapping object affects or contaminates the feature vector calculation for the object being overlapped. Pixel leakage between bounding boxes can corrupt the feature vectors and e.g., make them more similar than they should be due to the fact that the bounding boxes share pixel. Feature vector leakage may thus lead to inaccuracies in the feature representation and in subsequent analyses or tasks performed on the objects, e.g., re-identification.

In other examples, some overlap is allowed, for example such that the threshold amount is a predetermined percentage of the spatial extent of one of the overlapping objects. For instance, suppose that a first object with size X in the image frame is overlapping a second object that is 100 times larger (size 100×) in the image frame. The second object is only overlapped by 1% of the first object while the first object is overlapped by 100% of the second object. In case the threshold amount is 1% (inclusive), the second object will be added to the list of prioritized candidate objects for feature extraction while the first object will not. Consequently, object size is considered, which may influence the impact of feature vector leakage between objects.

In some embodiments, a maximum of N objects among the list of prioritized candidate objects is selected, wherein N is a predetermined number. Advantageously, N may be selected in view of the computational resources available for object re-identification.

In examples, upon the list of prioritized candidate objects consisting of more than N objects, the step of selecting comprises comparing each prioritized candidate object to one or more selection criteria, and selecting (at most) the N objects meeting at least one of the one or more selection criteria. A selection criterion may relate to object size, object detection probability, motion of object, object type, object shape, object orientation, etc. As a result, the present example may offer a flexible approach for identifying suitable objects for feature vector determination and object re-identification, considering any constraints imposed by limited computational resources. This approach may allow for efficient use of available resources and improved performance in object tracking and re-identification tasks.

In some examples, upon the list of prioritized candidate objects consisting of more than N objects, the step of selecting comprises ranking each prioritized candidate object according to one or more ranking criteria and selecting the N highest ranked objects. For example, the N objects may be ranked according to object size, object detection score, motion of object, object type, object shape, object orientation etc. As a result, the present example may offer a flexible approach for identifying suitable objects for feature vector determination and object re-identification, considering any constraints imposed by limited computational resources. This approach may allow for efficient use of available resources and improved performance in object tracking and re-identification tasks.

In some examples, the method further comprises the step of for each selected object, associating the determined feature vector with at least parts of the localization data of the selected object. The localization data may be used to determine relevance of a feature vector for a specific track when performing the object re-identification.

According to some embodiments, the method further comprises the step of for each selected object, associating the determined feature vector with a time stamp indicating a capturing time of the image frame. The time stamp can be utilized to assess the suitability of a feature vector for a particular object track during the object re-identification process. For instance, the maximum permissible distance between the position of a selected object and a track may be adjusted based on the time difference between the most recent object instance in the track and the time stamp of the selected object. This approach may enable more accurate and relevant object re-identification, taking into account the time-related dynamics of the tracked objects.

According to a second aspect of the invention, the above object is achieved by a system for prioritizing feature extraction for object re-identification in an object tracking application, comprising: one or more processors; and one or more non-transitory computer-readable media storing computer executable instructions that, when executed by the one or more processors, cause the system to perform actions comprising: receiving an image frame depicting a scene comprising a plurality of objects; receiving object detection data comprising, for each object of the plurality of objects, localization data indicating location and spatial extent of the object in the image frame; receiving motion data indicating one or more motion areas in the image frame, each motion area corresponding to an area in the scene where motion has been detected; for each motion area, determining a region of interest, ROI, for object feature extraction in the image frame, the ROI for object feature extraction overlapping with the motion area; for each ROI for object feature extraction, determining a list of objects at least partly overlapping with the ROI for object feature extraction using the object detection data, and associating the ROI for object feature extraction with the list of objects; determining a list of prioritized candidate objects for feature extraction by, for each ROI for object feature extraction associated with two or more objects: for each object of the two or more objects, upon determining that the object is not overlapping with any of the other objects of the plurality of objects with more than a threshold amount, adding the object to the list of prioritized candidate objects for feature extraction; and selecting at least one object among the list of prioritized candidate objects, and for each selected object determining a feature vector for the selected object based on image data of the image frame according to the localization data of the object.

According to a third aspect of the invention, the above object is achieved by one or more non-transitory computer-readable media storing instructions executable by one or more processors, wherein the instructions, when executed, cause the one or more processors to perform operations comprising: receiving an image frame depicting a scene comprising a plurality of objects; receiving object detection data comprising, for each object of the plurality of objects, localization data indicating location and spatial extent of the object in the image frame; receiving motion data indicating one or more motion areas in the image frame, each motion area corresponding to an area in the scene where motion has been detected; for each motion area, determining a region of interest, ROI, for object feature extraction in the image frame, the ROI for object feature extraction overlapping with the motion area; for each ROI for object feature extraction, determining a list of objects at least partly overlapping with the ROI for object feature extraction using the object detection data, and associating the ROI for object feature extraction with the list of objects; determining a list of prioritized candidate objects for feature extraction by, for each ROI for object feature extraction associated with two or more objects: for each object of the two or more objects, upon determining that the object is not overlapping with any of the other objects of the plurality of objects with more than a threshold amount, adding the object to the list of prioritized candidate objects for feature extraction; and selecting at least one object among the list of prioritized candidate objects, and for each selected object determining a feature vector for the selected object based on image data of the image frame according to the localization data of the object.

The second and third aspects may generally have the same features and advantages as the first aspect. It is further noted that the disclosure relates to all possible combinations of features unless explicitly stated otherwise.

BRIEF DESCRIPTION OF THE DRAWINGS

The above, as well as additional objects, features, and advantages of the present invention, will be better understood through the following illustrative and non-limiting detailed description of embodiments of the present disclosure, with reference to the appended drawings, where the same reference numerals will be used for similar elements, wherein.

DETAILED DESCRIPTION

Object tracking involves the process of detecting and monitoring the movement of objects in a scene, captured by a series of image frames. In case the tracking algorithm fails or loses track of an object for any reason, re-identification assists in regaining the lost track. Re-identification can be computationally complex due to several factors. For example, to perform re-identification, it may be necessary to extract features from objects that can effectively capture their appearance, pose, and other unique attributes. The resulting high-dimensional feature spaces can lead to increased computational demands when matching objects. Additionally, real-time processing demands and the use of computationally intensive deep learning models for feature extraction from objects may lead to situations where the available computational resources are insufficient, especially when a large number of objects are detected in the scene.

One reason re-identification is necessary in the object tracking applications is occlusion. Objects can become partially or fully occluded by other objects, making it difficult for the tracking system to maintain continuous tracking. Re-identification (ReID) helps to recognize the object once it reappears from behind the occluding object. However, occlusion may complicate the extraction of a feature vector (appearance vector, ReID vector, etc.) for the objects occluding or being occluded. For instance, when people in a crowd partially obstruct each other, the pixel data relating to a first person (i.e., pixel data from the bounding box of the first person) that partly occludes a second person may affect or contaminate the feature vector calculation for the second person. This scenario can complicate the process of accurately distinguishing and recognizing each individual.

The present disclosure aims to solve both above problems, by providing methods, systems and non-transitory computer-readable media for prioritizing feature extraction for object re-identification in an object tracking application.

Figure 1:
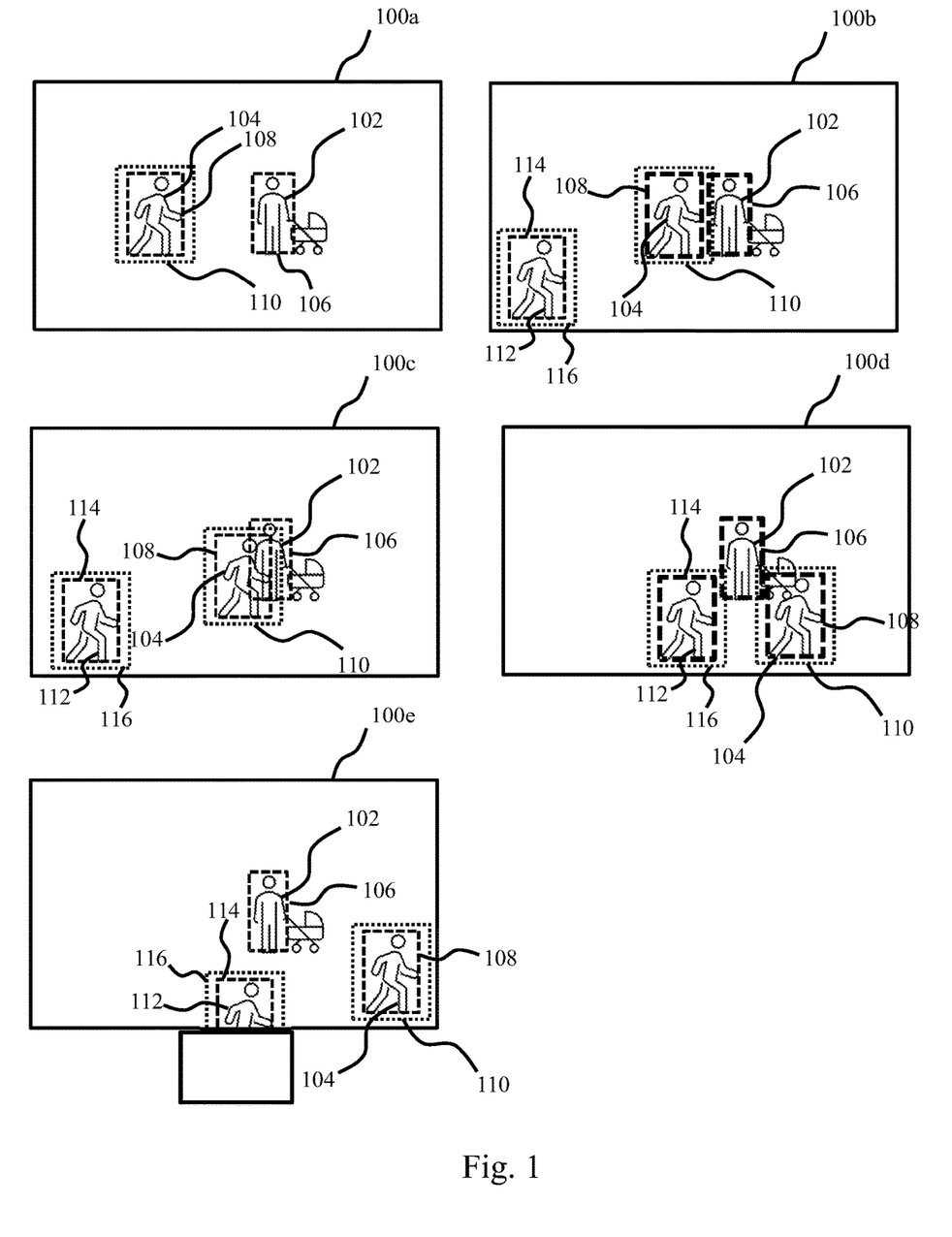
FIG. 1 shows a scenario of prioritizing feature extraction for object re-identification according to embodiments.

FIG. 1 shows a scene captured by five image frames 100a-c. In the scene, three objects 102, 104, 112 appears. In the scene of FIG. 1, the objects are all persons, but it should be noted that the techniques described herein may be applied on any suitable object type, such as cars, bicycles, animals, etc. The scene may be any type of scene, such as an indoor scene (room, corridor, library, a convenience store, a shopping mall, entrance of a building etc.) or an outdoor scene (a road, a park, a suburban neighbourhood, a beach, etc.). The techniques discussed here may offer greater advantages in scenarios with a higher number of objects. However, for the sake of simplicity in explanation, FIG. 1 demonstrates a case with only three objects 102, 104, 112. In FIG. 1, the locations and spatial extents of the objects 102, 104, 112 are shown as dashed (longer dashes) rectangles 106, 108 and 114. The locations and spatial extents are thus in this example shown as bounding boxes. However, depending to which object detection algorithm that is used, the form for the locations and spatial extents of the detected objects 102, 104, 112 may differ, and may include segmentation masks, bounding polygons, etc.

Moreover, in FIG. 1, region of interest, ROI, 110, 116 for object feature extraction in the image frame are shown as dashed (shorter dashes) rectangles. Each ROI 110, 116 is determined based on a motion area (area in the scene where motion has been detected) as will be further discussed in conjunction with FIGS. 2-4 below. It is important to note that the ROIs 110 and 116 depicted in FIG. 1 are included for illustrative purposes and may not accurately represent the ROIs as they would be identified in a real-life scenario.

Each ROI 110, 116 overlaps a respective moving object 104, 112 in the scene. The methods discussed herein for prioritizing feature extraction in object re-identification focus on limiting feature extraction to ROIs being at least partly overlapped by at least two objects, which may limit feature extractions to objects that risk becoming occluded, or that may recently have been occluded. In the context of FIG. 1, this implies that at least two bounding boxes 106, 108, 114 intersect with an ROI 110, 116.

In the first image frame 100a, two persons 102, 104 are shown. The first person 102 stands still while the second person 104 moves. In the first frame, the two persons are not close enough such that feature extractions for re-identification purposes as described herein comes into play. However, it should be noted that according to some embodiments, in case enough computational power is available for feature extraction and re-identification, feature extraction may be performed also for the two persons 102 and 104 even if they are not determined to be prioritized objects for feature extraction as described herein.

In the second image frame 100b, a third moving person 112 enters the scene. Moreover, the first person 102 and second person 104 are closer to each other. More specifically, both persons 102, 104 at least partly overlap with the ROI 110 (i.e., the bounding boxes 106, 108 of the persons 102, 104 at least partly overlaps with the ROI 110). Consequently, re-identification may be needed in the future to maintain continuous tracking of the persons 102, 104. However, to avoid the risk of that the feature vector computed for the first person 102 based on their visual appearance in image frame 100b might "leak" into the feature vector calculated for the second person 104, and vice versa, overlap between the persons 102, 104 (and also person 112) are checked. In image frame 100b, the persons do not overlap, i.e., the bounding boxes 106, 108 of the persons 102, 104 do not overlap. Consequently, the risk of "leakage" is determined to be low, and the persons 102, 104 are thus determined to be prioritized candidate objects for feature extraction (shown by the bolded rectangles 108, 106 in FIG. 1). The third person 112 is determined to not be a prioritized candidate object for feature extraction, since it is sufficiently far away from any of the other objects 102, 104, as discussed herein.

In the third image frame 100c, both the first person 102 and the second person 104 still at least partly overlaps with the ROI 110. However, different to the second image frame 100b, the persons 102, 104 now overlap with each other (i.e., the bounding boxes 106, 108 of the persons 102, 104 overlap). As will be discussed below in conjunction with FIG. 5, in case objects overlaps with more than a threshold extent, the objects are not considered to be prioritized candidate objects for feature extraction since the risk of leakage of visual appearance of the overlapping objects when determining feature vectors for the overlapping objects is considered to be too high. In the example of FIG. 1, in the third image frame 100c, the first 102 and the second 104 person are considered to overlap with a too high extent, and thus, the persons 102, 104 are not determined to be prioritized candidate objects for feature extraction. The third person 112 is determined to not be a prioritized candidate object for feature extraction, since the third person 112 is sufficiently far away from any of the other objects 102, 104, as discussed herein.

In the fourth image frame 100d, both the first ROI 110 and a second ROI 116 are associated with two objects in the scene, meaning that two objects at least partly overlap each of the ROIs 110, 116. Both the first person 102 and the second person 104 still at least partly overlaps with the first ROI 110. Moreover, both the first person 102 and the third person 112 at least partly overlaps with the second ROI 116. For the first ROI 110, it is determined that associated objects 102, 104 do not overlap with each other (or with object 112), and both are thus added to the list of prioritized candidate objects. For the second ROI 116, it is determined that the associated objects 102, 112 do not overlap with each other (or with object 104), and both are thus added to the list of prioritized candidate objects. It should be noted that in some embodiments, in case an object is already added to the list of prioritized candidate objects, it cannot be added again. In other embodiments, any duplicates are removed when at least one object among the list of prioritized candidate objects are selected for determining a feature vector as further described below.

In the fifth image frame 100e, all objects are sufficiently far away such that no prioritized candidate objects for feature extraction are determined. In other words, none of the ROIs 110, 116 is associated with at least two objects as described herein.

Figure 2:
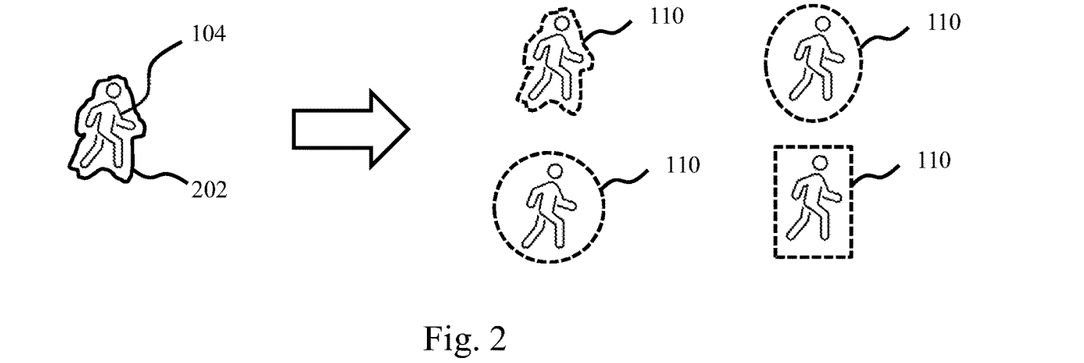
FIGS. 2-4 show schematic examples of determining a region of interest for object feature extraction according to embodiments.
Figure 3:
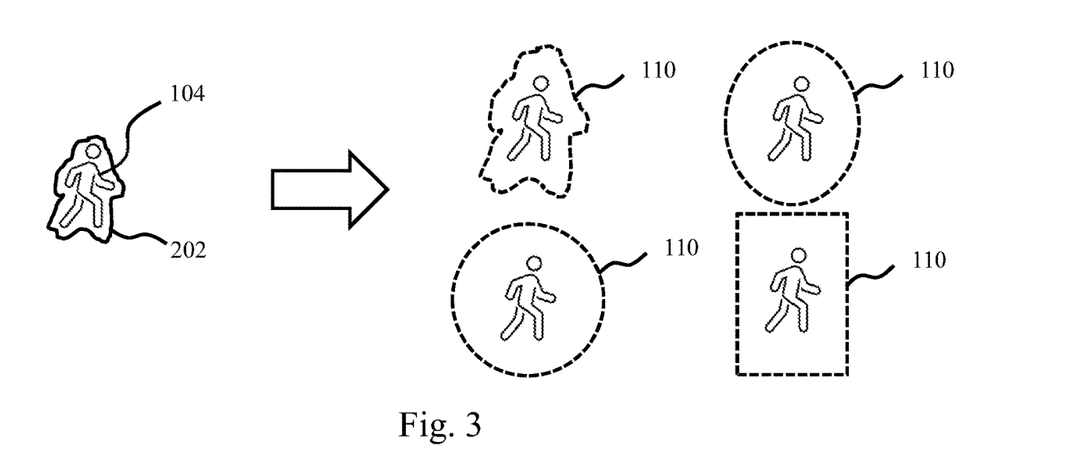
Figure 4:
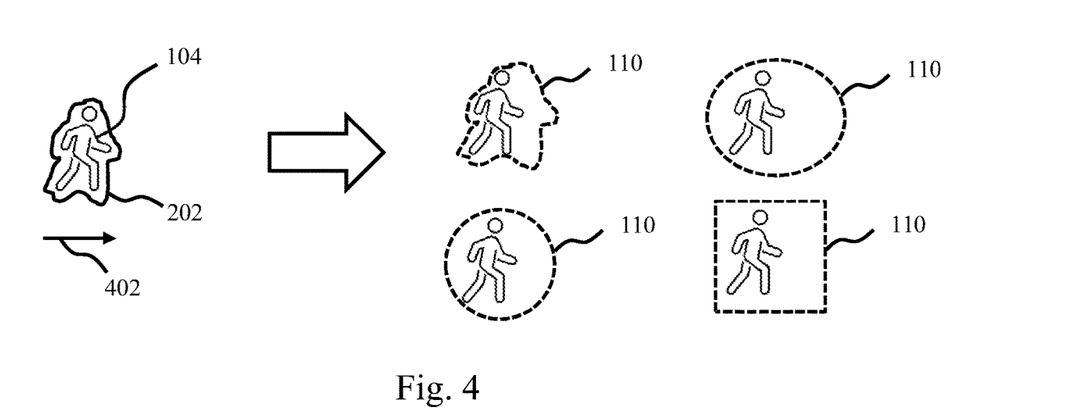

FIGS. 2-4 shows by way of example how ROIs 110 may be determined based on a motion area 202 in an image frame. In FIGS. 2-4, a cropped portion of an image frame is shown. The cropped portion includes an object 104, accompanied by a motion area 202 from the image frame. The motion area 202 is in the examples of FIGS. 2-4 shown as a pixel mask 202. However, other ways of representing a motion area in an image frame may be used, such as a polygon, a rectangle etc. The motion areas 202 may be determined by identifying changes (e.g., using frame differencing, background subtraction, temporal filters, etc.) in the scene over time, typically by comparing consecutive or nearby frames.

In FIG. 2, four examples of how to determine a ROI 110 based on a motion area 202 are shown. The top-left example represents the case where the ROI 110 has the shape of a pixel mask 110. In the top-left example of FIG. 2, the ROI 110 has the same form and extent as the motion area 202. The bottom-left example in FIG. 2 represents the case where the ROI 110 has the form of a circle, fully overlapping the motion area 202. The top-right example in FIG. 2 represents the case where the ROI 110 has the form of an ellipse, fully overlapping the motion area 202. The bottom-right example in FIG. 2 represents the case where the ROI 110 has the form of a rectangle, fully overlapping the motion area 202.

FIG. 3 shows four other examples of how to determine a ROI 110 based on a motion area 202. In some embodiments, determining a ROI for object feature extraction comprises extending the motion area by a predetermined extent in each direction. In the example of FIG. 3, the motion area 202 has been extended uniformly in each direction. However, in other examples, the motion area 202 may be extended using other strategies, for example to a larger extent in a horizontal direction compared to the vertical direction. Typically, motion in the scene has a larger velocity in a horizontal direction compared to a velocity in a vertical direction, which may be advantageously captured by such an embodiment. In FIG. 3, each of the four examples correspond to the examples of FIG. 2, however, the ROIs 110 in FIG. 3 have all been extended uniformly in each direction compared to the ROIs 110 in FIG. 2.

FIG. 4 shows four other examples of how to determine a ROI 110 based on a motion area 202. In some embodiments, a motion area 202 in the image frame is associated with an indication of a velocity of the detected motion. There are several options on how to accomplish this, for example:

Motion detection via optical flow: This method tracks how different parts of the image appear to move between frames and calculates the velocity of the motion.

Spatio-temporal motion detection: This method separates foreground and background elements, looks for gradients in "image volumes" over time, and identifies blobs with motion information and direction to calculate velocity.

Solutions via neural networks: This method involves training a neural network to recognize and track motion in images, and then using the network to detect and calculate velocity of motion areas.

Output from a tracker from the previous frame: This method involves correlating tracked objects from previous frames with the motion area in the current frame to assume that the object's velocity is equal to the motion area's velocity.

In FIG. 4, the velocity is indicated by an arrow 402. The velocity in the example of FIG. 4 is thus horizontal and has a direction to the right. The ROI 110 may thus be extended based on the velocity, for example by being extended to greater extent in a direction corresponding to the direction of the velocity 402 compared to a direction not corresponding to the direction of the velocity 402. In another example, the ROI may be extended both in the direction of the velocity, and in an opposite direction to the velocity, in order for the object 104 to be prioritized both before and after an occlusion. In yet other embodiments, the ROI may be extended based on both the direction and the magnitude of the velocity such that a larger magnitude result in a larger extension compared to a smaller magnitude.

In FIG. 4, each of the four examples correspond to the examples of FIG. 3, however, the ROIs 110 in FIG. 4 have all been extended according to the velocity compared to the ROIs 110 in FIG. 3 that have been extended uniformly in each direction. The size of the ROI extension may thus be a function of the velocity of the object, i.e., how far the object is expected to move in a certain time frame. Additionally, the analysis speed of the system may be taken into account, i.e., how quickly the system can perform the necessary analyses. To ensure that the system has enough time to analyse the object before it becomes occluded (or exits the scene as captured by a video sequence comprising the image frame), a margin may be added to the size of the ROI extension. This margin allows the system more time to perform the necessary analyses before the object is lost or occluded.

Figure 5:
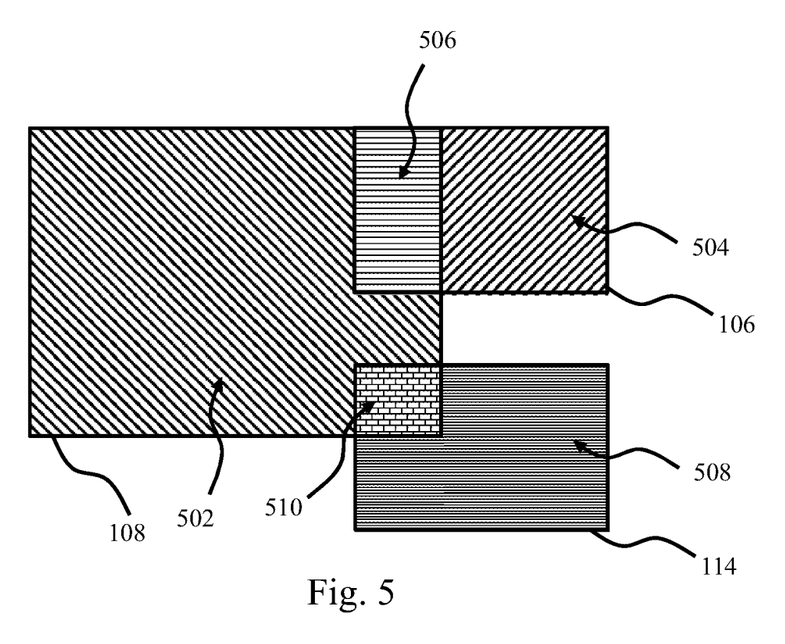
FIG. 5 shows overlapping bounding boxes of objects according to embodiments.

FIG. 5 shows by way of example three overlapping objects, schematically represented by bounding boxes 106, 108, 114. As discussed herein, visual appearance leakage can occur when overlapping objects are not properly separated during the feature extraction process. For example, if one object partially covers another, the feature extraction process might inadvertently include information from both objects in the overlapping region. As a result, the feature vector of the partially occluded object may contain visual appearance characteristics of the occluding object. In some cases, an overlap below a certain threshold may still yield a sufficiently accurate feature vector. This is because a majority of the image data used for determining the feature vector for an object may still be derived from the correct object, despite the overlap. In FIG. 5, a bounding box 106 of a first object is overlapped to a certain extent 506 by a bounding box 108 of a second object, which means that an area 504 is not overlapped by any other object. The bounding box 108 of the second object is overlapped by bounding boxes 106, 114 of two objects and the extent of the overlap is represented by areas 506 and 510 in FIG. 5, which means that an area 502 is not overlapped by any other object. The bounding box 114 of the third object is thus overlapped to a certain extent 510 by the bounding box 108 of the second object, which means an area 508 is not overlapped by any other object.

According to embodiments, an object may be considered as a prioritized candidate object for feature extraction upon determining that the object is not overlapping with any of the other objects with more than a threshold amount. In some embodiments, the threshold amount is 0. In some embodiments, the threshold amount (i.e., allowed extent of the overlap) is a predetermined percentage of the spatial extent of one of the overlapping objects. Examples of the predetermined percentage may be 1%, 5%, 7%, 10%, 25%, etc. For example, for the case of the overlap between the first and the second object, the extent of the overlap 506 may be considered too high compared to the total area of the bounding box 106 of the first object, which means that the first object is not included among the prioritized candidate objects as described herein. For the case of the overlap between the second and the third object, the extent of the overlap 510 may be considered to be not exceeding the threshold (i.e., the overlap area 510 compared to the total area of the bounding box 114 of the third object), which means that the third object is included among the prioritized candidate objects as described herein. For the second object, being overlapped by two objects, in some embodiments, the total area (506+510) of the overlap is compared to the full area of the bounding box 108, to determine if the second object should be included among the prioritized candidate objects. In other embodiments, in case one of the areas 506, 510 is considered to be above the threshold compared to the to the total area of the bounding box 108 of the second object, the second object is not included among the prioritized candidate objects.

Figure 6:
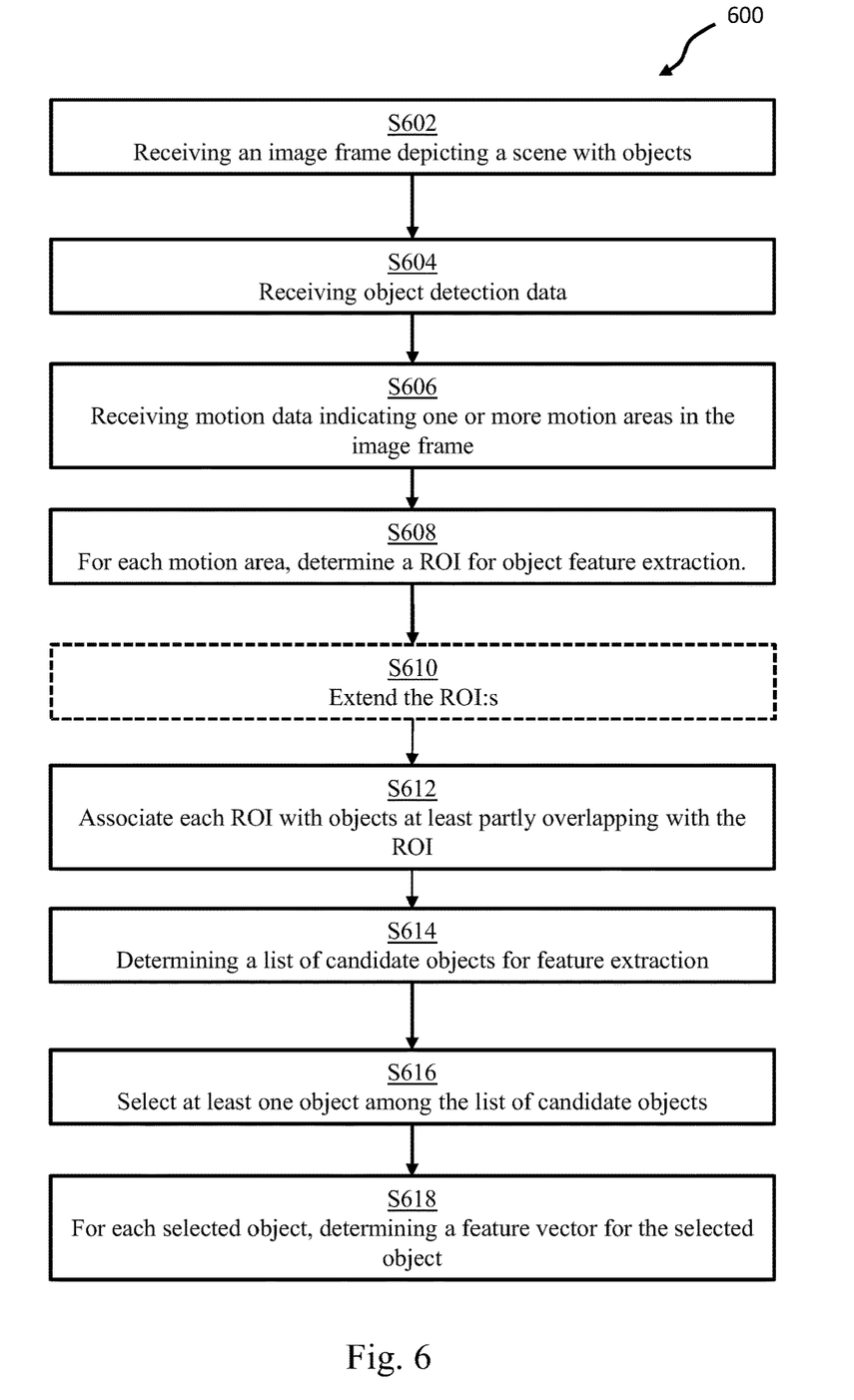
FIG. 6 shows a flow chart of a method for prioritizing feature extraction for object re-identification in an object tracking application according to embodiments.
Figure 8:
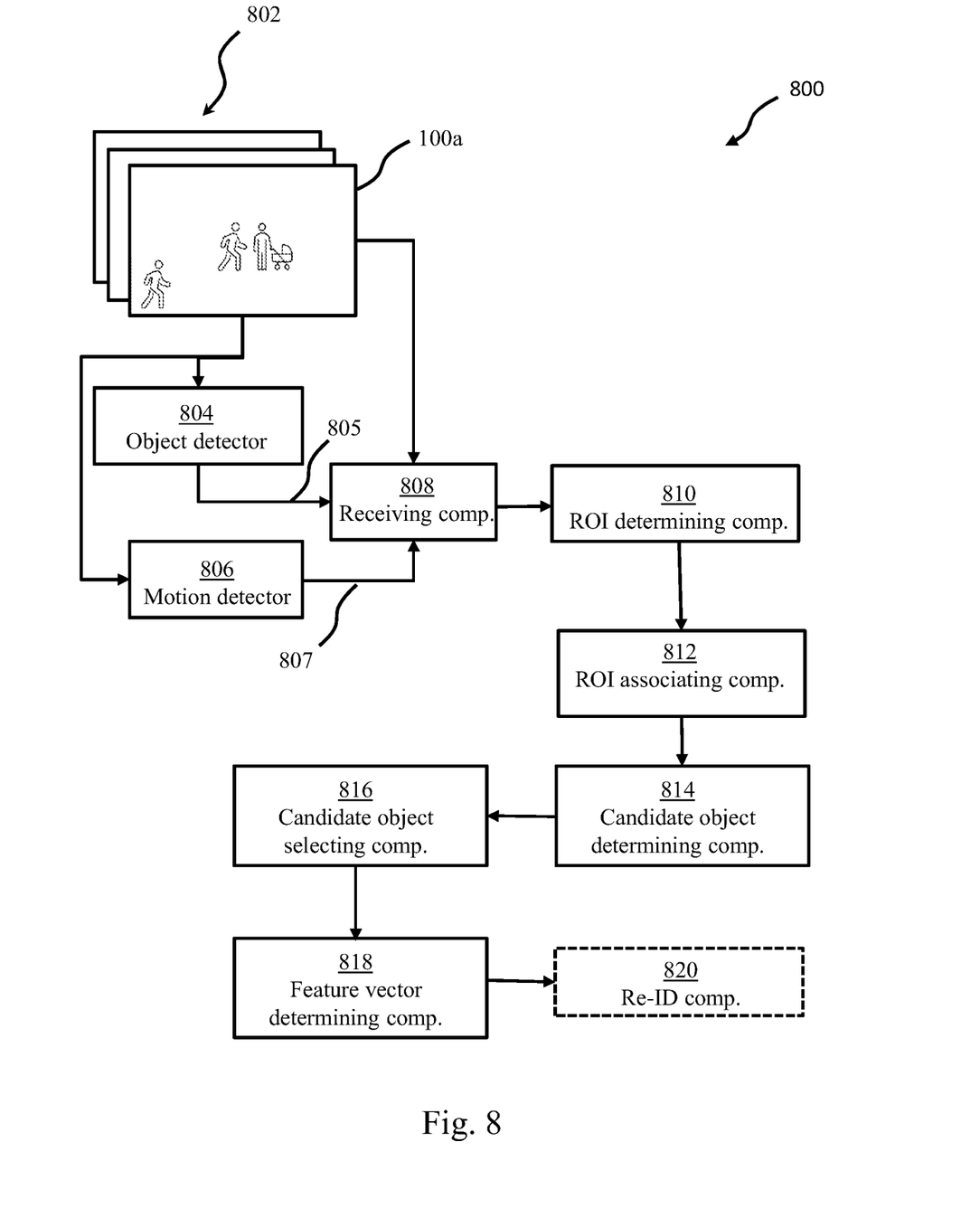
FIG. 8 shows a system implementing the methods of FIGS. 6-7, according to embodiments.

FIG. 6 shows by way of example a flow chart of a method 600 for prioritizing feature extraction for object re-identification in an object tracking application. The method 600 will now be described in conjunction with FIG. 8 showing by way of example a system 800 implementing the method 600. The method 600 comprises the step of receiving S602, by a receiving component 808, an image frame (100a) depicting a scene comprising a plurality of objects. The image frame may for example be a frame from a video sequence 802 depicting a scene as captured by a camera.

The method 600 further comprises the step receiving S604, by the receiving component 808, object detection data 805 comprising, for each object of the plurality of objects, localization data indicating location and spatial extent of the object in the image frame. The object detection data may be received from an object detection component 804. The object detector component may implement any suitable conventional algorithm for object detection, such as a Haar cascade classifier, Histogram of Oriented Gradients (HOG), Region-based Convolutional Neural Networks (R-CNN), etc. The object detector component may comprise an artificial intelligence (AI) or machine learning (ML) algorithm trained to detect objects of interests in an image. AI/ML is a suitable technology for detecting objects in an image and may relatively easily be trained with a large labelled/annotated dataset of images that contain the object type(s) of interest. It should be noted that there are several object detection algorithms that do not rely on neural networks. These methods may be based on classical computer vision such as Scale-Invariant Feature Transform (SIFT), Template matching, etc.

The method 600 further comprises receiving S606, by the receiving component 808, motion data 807 indicating one or more motion areas in the image frame, each motion area corresponding to an area in the scene where motion has been detected. In some embodiments, the motion data further comprises, for each motion area in the image frame, an indication of a velocity of the detected motion in the corresponding area of the scene. The motion data 807 may be received from a motion detection component 806. The motion detector may implement any suitable algorithm (as described herein) for detecting motion in a scene (captured by a video sequence), typically by comparing consecutive or nearby frames.

The method 600 further comprises, for each motion area, determining S608, by a region of interest, ROI, determining component 810, a ROI for object feature extraction in the image frame, the ROI for object feature extraction overlapping with the motion area. The ROI may further be extended S610 (as further described above in conjunction with FIGS. 2-4) by the ROI determining component 810, e.g., by extending ROI derived from the motion area.

The method 600 further comprises, for each ROI for object feature extraction, determining a list of objects at least partly overlapping with the ROI for object feature extraction using the object detection data, and associating S612, by a ROI associating component 812, the ROI for object feature extraction with the list of objects.

The method 600 further comprises determining S614, by a candidate object determining component 814, a list of prioritized candidate objects for feature extraction as will be further described below in conjunction with FIG. 7.

The method further comprises selecting S616, by a candidate object selecting component 816, at least one object among the list of prioritized candidate objects. The selection S616 may comprise removing duplicates from the list of prioritized candidate objects. The selection may limit the number of objects used to determine feature vectors to a certain number (N). Such limitation may further comprise comparing each prioritized candidate object to one or more selection criteria and selecting (at most) the N objects meeting at least one of the one or more selection criteria. The selection criteria may be configurable based on the application or requirements of the application. For example, the selection criteria may comprise selecting objects of a certain object type, and/or of a certain size, and/or associated with a speed of motion, etc. An object may in embodiments be associated with a speed of motion in case it overlaps to a high extent (fully, 95%, etc.) with a motion area associated with the speed of motion. In some embodiments, such limitation may comprise ranking each prioritized candidate object according to one or more ranking criteria and selecting the N highest ranked objects. The ranking criteria may for example comprise ranking based on object size, based on confidence score from the object detector, speed of the object, etc.

The method 600 further comprises, for each selected object, determining S618, by a feature vector determining component 818, a feature vector for the selected object based on image data of the image frame according to the localization data of the object. Any suitable algorithm for determining a feature vector from image data may be used. Example algorithms include:

Scale-Invariant Feature Transform (SIFT): SIFT is a feature extraction algorithm that detects and describes local features in an image. It may be considered robust to changes in scale and rotation.

Speeded Up Robust Feature (SURF): SURF is a feature extraction algorithm that is similar to SIFT but may be considered faster and more robust to changes in lighting and viewpoint.

Histogram of Oriented Gradients (HOG): HOG is a feature extraction algorithm that counts the occurrences of gradient orientation in localized portions of an image.

Convolutional Neural Networks (CNNs): CNNs are a type of deep learning algorithm that can be used for feature extraction from images. They learn features from images by using multiple layers of convolutions and pooling.

Local Binary Patterns (LBP): LBP is a texture descriptor that extracts local features from an image by comparing each pixel to its surrounding neighbours.

Feature extraction using object or sub-object classification functionality: This technique includes detecting for example clothes, accessories, etc of a person (colour of sweater, wears a handbag, uses glasses, wears a hat, etc), type of vehicle (red pickup, black SUV etc.), or similar features of an object.

The feature vector may subsequently be used by a re-identification component 820, e.g., to identify the selected object in the image frame as the same object that was previously detected in a previous frame or frames of the same video sequence 802, or detected in another video sequence. In another embodiment, the feature vector may be transmitted to a tracker that can use it to create more robust tracks or recreate tracks that have been lost due to occlusion. One example of using feature vectors for purpose is described in "Simple Online and Realtime Tracking with a Deep Association Metric" (Wojke et al., https://arxiv.org/abs/1703.07402 at the time of filing this application).

In some embodiments, a determined feature vector may be associated with at least parts of the localisation data of the corresponding selected object. For example, a position of the selected object may be associated with the feature vector. Such information may be used by the re-identification component 820 to determine relevance of the feature vector for a track which have been lost in the video sequence. For example, some object movements may be considered unreasonable. Very large movements, such as across the image in just one frame, are probably instead two different objects that look alike. A tracker including a re-identification component 820 usually has a limited area based on the latest detection of an object that it expects the object to reappear in, based on the object's speed and some margin of error. If the object is lost, the radius is usually increased to enable re-association, for example when a person walks behind a bush. Association with the given track from detections outside that radius is usually "expensive" (requires very secure matching) or prohibited.

In some embodiments, a determined feature vector may be associated with a time stamp indicating a capturing time of the image frame. Such information may be used by the re-identification component 820 to determine relevance of the feature vector for a track which have been lost in the video sequence. For example, the time stamp may be used to determine an acceptable distance between a location of the selected object and a last instance of a lost track. Moreover, the time stamp may be used to determine relevance of the feature vector when performing long-term tracking.

Figure 7:
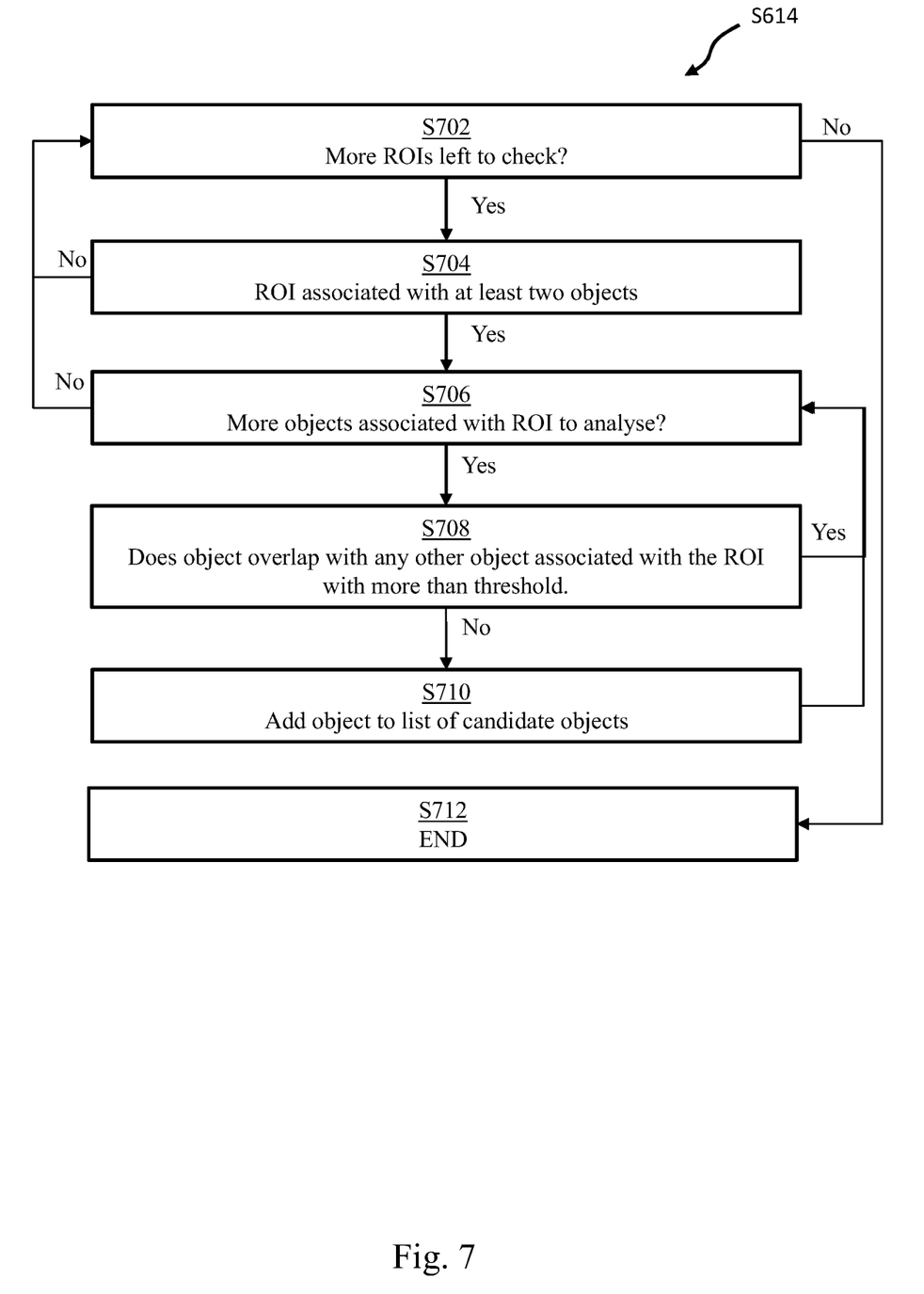
FIG. 7 shows a flow chart of a method of determining a list of prioritized candidate objects for feature extraction from one or more regions of interest for object feature extraction, according to embodiments.

FIG. 7 shows by way of example more details for the step of determining S614 a list of prioritized candidate objects for feature extraction in FIG. 6. The step S614 is performed for all ROIs in an image frame as determined in step S608 (and possibly extended in S610) in the method of FIG. 6. Consequently, when all ROIs have been checked S702, the step of determining S614 a list of prioritized candidate objects for feature extraction is ended S712. For each ROI, it is checked S704 whether the ROI is associated with two or more objects (i.e., the number of objects at least partly overlapping with the ROI as determined in the associating step S612 above). If this is true, each object of the two or more objects associated with the ROI is analysed S708 to determine if the objects should be added S710 to the list of prioritized candidate objects. The method thus comprises an analysing step S708 of checking whether the object is overlapping with any of the other objects of the plurality of objects with more than a threshold amount. In case none of the other objects among the plurality of objects detected in the image frame (i.e., as identified in the object detection data received in step S604 of FIG. 6) overlap with the currently analysed object with more than the threshold amount, the currently analysed object is added S710 to the list of prioritized candidate objects. The analysing step S708 (and the adding step S710 if applicable) is performed until all objects have been analysed (as determined in step S706). When its determined S706 that all objects associated with a ROI has been analysed, the next ROI is checked and so on.

The methods shown in FIGS. 6-7, as well as any other methods or functionality described herein, may be stored on a non-transitory computer-readable storage medium as instructions, such that the methods are implemented when the instructions are executed on a device or system having processing capabilities. Such device or system (e.g., as shown in FIG. 8) may comprise one or more processors. The system 800 may in examples be implemented in a single device such as a camera. In other examples, some or all of different components (modules, units, etc.) 804-820 may be implemented in a server or in the cloud. In some examples, a camera implements all components of FIG. 8 except the re-identification component 820 which may be implemented by e.g., a server. In some examples, a camera implements all components of FIG. 8 except the feature vector determining component 818 and the re-identification component 820 which may be implemented by e.g., a server. In other examples, a subset of the components of FIG. 8 is implemented on a camera, such as image capture (capturing the video sequence 802) and motion detection 804, while the other components are implemented in a server. Generally, the device (camera, server, etc.) or devices implementing the components 804-820 may each comprise circuitry which is configured to implement the components 804-820 and, more specifically, their functionality. The features and methods described herein can thus be implemented advantageously in one or more computer programs that are executable on a programmable system that may include at least one programmable processor coupled to receive data and instructions from, and to transmit data and instructions to, a data storage system, at least one input device such as a camera for capturing the image frames/video sequence, and at least one output device such as a display used to display the images, potentially in an object tracking application including tracked objects as described herein. Suitable processors for the execution of a program of instructions include, by way of example, both general and special purpose microprocessors, and the sole processor or one of multiple processors or cores, of any kind of computer. The processors can be supplemented by, or incorporated in, ASICs (application-specific integrated circuits).

The above embodiments are to be understood as illustrative examples of the invention. Further embodiments of the invention are envisaged. For example, the motion data may be received from the object tracker component and based on the movement of the objects it tracks between image frames. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A computer-implemented method for prioritizing objects for feature extraction for the purpose of object re-identification in an object tracking application, comprising the steps of:
   receiving an image frame depicting a scene comprising a plurality of objects;
   receiving object detection data comprising, for each of the plurality of objects, localization data indicating location and spatial extent of the object in the image frame;
   receiving motion data indicating one or more motion areas in the image frame, each motion area corresponding to an area in the scene where motion has been detected, wherein the motion data further comprises, for each motion area in the image frame, an indication of a velocity of the detected motion in the corresponding area of the scene;
   for each motion area, determining a region of interest (ROI) for object feature extraction in the image frame, the ROI for object feature extraction overlapping with the motion area, and extending the ROI based on the velocity;
   for each ROI for object feature extraction, determining a list of objects at least partly overlapping with the ROI for object feature extraction using the object detection data, and associating the ROI for object feature extraction with the list of objects;
   determining a list of prioritized candidate objects for feature extraction by, for each ROI for object feature extraction associated with two or more objects:
      for each object of the two or more objects, upon determining that the object is not overlapping with any of the other objects of the plurality of objects with more than a threshold amount, adding the object to the list of prioritized candidate objects for feature extraction; and
   selecting at least one object among the list of prioritized candidate objects, and for each selected object determining a feature vector for the selected object based on image data of the image frame according to the localization data of the object.

2. The method of claim 1, wherein the step of determining an ROI for object feature extraction comprises extending the motion area by a predetermined extent in each direction.

3. The method of claim 2, wherein the ROI for object feature extraction is determined by extending the motion area to a greater extent in a direction corresponding to the direction of the velocity compared to a direction not corresponding to the direction of the velocity.

4. The method of claim 1, wherein a shape of the ROI for object feature extraction is one of: a pixel mask, a circle, an ellipse, or a rectangle.

5. The method of claim 1, wherein the threshold amount is 0.

6. The method of claim 1, wherein the threshold amount is a predetermined percentage of the spatial extent of one of the overlapping objects.

7. The method of claim 1, wherein a maximum of N objects among the list of prioritized candidate objects is selected, wherein N is a predetermined number.

8. The method of claim 7, wherein upon the list of prioritized candidate objects comprising more than N objects, the step of selecting comprises comparing each prioritized candidate object to one or more selection criteria, and selecting the N objects meeting at least one of the one or more selection criteria.

9. The method of claim 7, wherein upon the list of prioritized candidate objects comprising more than N objects, the step of selecting comprises ranking each prioritized candidate object according to one or more ranking criteria, and selecting the N highest ranked objects.

10. The method of claim 1, further comprising the step of:
for each selected object, associating the determined feature vector with at least parts of the localization data of the selected object.

11. The method of claim 1, further comprising the step of:
for each selected object, associating the determined feature vector with a time stamp indicating a capturing time of the image frame.

12. A system for prioritizing feature extraction for object re-identification in an object tracking application, comprising:
one or more processors; and
one or more non-transitory computer-readable media storing computer executable instructions that, when executed by the one or more processors, cause the system to perform actions comprising:
receiving an image frame depicting a scene comprising a plurality of objects;
receiving object detection data comprising, for each of the plurality of objects, localization data indicating location and spatial extent of the object in the image frame;
receiving motion data indicating one or more motion areas in the image frame, wherein the motion data further comprises, for each motion area in the image frame, an indication of a velocity of the detected motion in the corresponding area of the scene, each motion area corresponding to an area in the scene where motion has been detected;
for each motion area, determining a region of interest (ROI) for object feature extraction in the image frame, the ROI for object feature extraction overlapping with the motion area, and extending the ROI based on the velocity;
for each ROI for object feature extraction, determining a list of objects at least partly overlapping with the ROI for object feature extraction using the object detection data, and associating the ROI for object feature extraction with the list of objects;
determining a list of prioritized candidate objects for feature extraction by, for each ROI for object feature extraction associated with two or more objects:
for each object of the two or more objects, upon determining that the object is not overlapping with any of the other objects of the plurality of objects with more than a threshold amount, adding the object to the list of prioritized candidate objects for feature extraction; and
selecting at least one object among the list of prioritized candidate objects, and for each selected object determining a feature vector for the selected object based on image data of the image frame according to the localization data of the object.

13. At least one non-transitory computer-readable media storing instructions executable by one or more processors, wherein the instructions, when executed, cause the one or more processors to perform operations comprising:
receiving an image frame depicting a scene comprising a plurality of objects;
receiving object detection data comprising, for each object of the plurality of objects, localization data indicating location and spatial extent of the object in the image frame;
receiving motion data indicating one or more motion areas in the image frame, wherein the motion data further comprises, for each motion area in the image frame, an indication of a velocity of the detected motion in the corresponding area of the scene, each motion area corresponding to an area in the scene where motion has been detected;
for each motion area, determining a region of interest (ROI) for object feature extraction in the image frame, the ROI for object feature extraction overlapping with the motion area, and extending the ROI based on the velocity;
for each ROI for object feature extraction, determining a list of objects at least partly overlapping with the ROI for object feature extraction using the object detection data, and associating the ROI for object feature extraction with the list of objects;
determining a list of prioritized candidate objects for feature extraction by, for each ROI for object feature extraction associated with two or more objects:
for each object of the two or more objects, upon determining that the object is not overlapping with any of the other objects of the plurality of objects with more than a threshold amount, adding the object to the list of prioritized candidate objects for feature extraction; and
selecting at least one object among the list of prioritized candidate objects, and for each selected object determining a feature vector for the selected object based on image data of the image frame according to the localization data of the object.

* * * * *